United States Patent
Loewenstein

(10) Patent No.: US 8,756,378 B2
(45) Date of Patent: Jun. 17, 2014

(54) BROADCAST PROTOCOL FOR A NETWORK OF CACHES

(75) Inventor: Paul N. Loewenstein, Palo Alto, CA (US)

(73) Assignee: Oracle International Corporation, Redwood City, CA (US)

( * ) Notice: Subject to any disclaimer, the term of this patent is extended or adjusted under 35 U.S.C. 154(b) by 620 days.

(21) Appl. No.: 13/030,006

(22) Filed: Feb. 17, 2011

(65) Prior Publication Data

US 2012/0215987 A1    Aug. 23, 2012

(51) Int. Cl.
*G06F 13/00* (2006.01)
*G06F 13/28* (2006.01)

(52) U.S. Cl.
USPC ..... 711/143; 711/144; 711/141; 711/E12.037

(58) Field of Classification Search
CPC ..................... G06F 12/0833; H04L 29/08306
See application file for complete search history.

(56) References Cited

U.S. PATENT DOCUMENTS 7,600,080 B1 * 10/2009 Bhattacharyya et al. ..... 711/143
2006/0146057 A1    7/2006 Blythe

FOREIGN PATENT DOCUMENTS

EP    1008047 B1    9/2003
RU    2406128 C2    12/2010

OTHER PUBLICATIONS

International Search Report and Written Opinion issued in PCT/US2012/024056 mailed May 17, 2012 (7 pages).

* cited by examiner

*Primary Examiner* — Eric S Cardwell
(74) *Attorney, Agent, or Firm* — Osha Liang LLP

(57) ABSTRACT

A method for managing caches, including: broadcasting, by a first cache agent operatively connected to a first cache and using a first physical network, a first peer-to-peer (P2P) request for a memory address; issuing, by a second cache agent operatively connected to a second cache and using a second physical network, a first response to the first P2P request based on a type of the first P2P request and a state of a cacheline in the second cache corresponding to the memory address; issuing, by a third cache agent operatively connected to a third cache, a second response to the first P2P request; and upgrading, by the first cache agent and based on the first response and the second response, a state of a cacheline in the first cache corresponding to the memory address.

20 Claims, 20 Drawing Sheets

| Cache line State | Description | Cache Access Rights |
|---|---|---|
| M | Modified (supplier); inter-processor state M | Read/write access |
| O | Dirty (supplier), inter-processor state O | Read-only access |
| D | Modified (supplier), inter-processor state M | Read-only access |
| E | Exclusive (supplier), inter-processor state E | Read/write access |
| X | Supplier, inter-processor state E | Read-only access |
| Q | Supplier, inter-processor state S | Read-only access |
| S | Shared with another cache on the same processor | Read-only access |
| I | Invalid | No access |

Table 200

| Inter-processor State | Description |
|---|---|
| M | Read/write access; must be written back to memory upon eviction from the cache(s) |
| O | Read-only access; must be written back to memory upon eviction from the cache(s) |
| E | Read/write access; need not be written back to memory upon eviction from the cache(s) |
| S | Read-only access; need not be written back to memory upon eviction from the cache(s) |
| I | Cacheline not present in processor's cache(s) |

Table 205

FIG. 2

| P2P Request Type | Description | Trigger |
|---|---|---|
| PRTS | Request for read access | Load to absent cacheline (state I) |
| PRTO | Request for read/write access | Store to absent cacheline (state I) |
| PRTU | Request for upgrade to read/write access from read-only access | Store to cacheline in D, O, X, Q, S |
| PWB | Request to write back (no access) | No space to allocate for PRTS or PRTO |

Table 300

| Response Type | Description |
|---|---|
| Ack/NAck | Positive Acknowledgement / Negative Acknowledgement |
| DataM/AckM | Data / Acknowledgement, inter-processor state M |
| DataO/AckO | Data / Acknowledgement, inter-processor state O |
| DataE/AckE | Data / Acknowledgement, inter-processor state E |
| DataS/AckS | Data / Acknowledgement, inter-processor state S |
| WBAck | Pull of write back acknowledgement |
| WBPull | Pull of write back data |

Table 350

FIG. 3

| | Slave Cacheline State | | | | | |
|---|---|---|---|---|---|---|
| Incoming P2P Request | M, D | O | E, X | Q | S | I |
| PRTS | DataM | DataO | DataE | DataS | Ack | Ack |
| PRTO | DataM | DataO | DataE | DataS | Ack | Ack |
| PRTU | AckM | AckO | AckE | AckS | Ack | Ack |

Table 600

FIG. 6

| P2P Request Type | Slave Cacheline State | | |
|---|---|---|---|
| | M, D, O, E, X, Q, S | | I |
| PRTS | S | — | — |
| PRTO | — | — | — |
| PRTU | — | — | — |

Table 700

FIG. 7

| Response Type | Next Cacheline State |
|---|---|
| DataM or AckM | D |
| DataO or AckO | O |
| DataE or AckE | X |
| DataS or AckS | Q |

Table 1005

| Current Cacheline State | PRTO or PRTU (Final Cacheline State) |
|---|---|
| D | M |
| X | E |
| O, Q, S | No Change |
| I | No Change |

Table 1010

FIG. 10

| Received | Cache State | Sent | New State |
|---|---|---|---|
| WBAck | M, D | AckM | I |
|  | O | AckO | I |
|  | E, X | AckE | I |
|  | Q | AckS | I |
|  | S, I | Nack | I |
| WBPull | M, D | DataM | I |
|  | O | DataO | I |
|  | E, X | DataE | I |
|  | Q | DataS | I |
|  | S, I | Nack | I |
| Nack | - | - | - |

Table 1300

US 8,756,378 B2

BROADCAST PROTOCOL FOR A NETWORK OF CACHES

BACKGROUND

In computing, cache coherence or cache coherency refers to the consistency of data stored in local caches of a shared resource. When clients in a system maintain caches of a common memory resource, problems may arise with inconsistent data. This is particularly true of CPUs in a multiprocessing system. Cache coherence is intended to maintain consistency both between caches and between the caches and memory so that the presence of the caches is essentially invisible to the system programmer except for their effect on performance.

A coherence protocol is a protocol which maintains the consistency between all the caches in a system of distributed shared memory. For a given memory model,

SUMMARY

In general, in one aspect, the invention relates to a method for managing caches. The method comprises: broadcasting, by a first cache agent operatively connected to a first cache and using a first physical network, a first peer-to-peer (P2P) request for a memory address; issuing, by a second cache agent operatively connected to a second cache and using a second physical network, a first response to the first P2P request based on a type of the first P2P request and a state of a cacheline in the second cache corresponding to the memory address; issuing, by a third cache agent operatively connected to a third cache, a second response to the first P2P request; and upgrading, by the first cache agent and based on the first response and the second response, a state of a cacheline in the first cache corresponding to the memory address.

In general, in one aspect, the invention relates to a method for managing caches. The method comprises: broadcasting, by a first cache agent operatively connected to a first cache and using a first physical network, a peer-to-peer (P2P) writeback request for a memory address; identifying, by a second cache agent operatively connected to a second cache and in response to the P2P writeback request, a shared status of a cacheline in the second cache corresponding to the memory address; issuing, by the second cache agent and in response to identifying the shared status, a writeback positive acknowledgment (WBAck) to the first cache agent using a second physical network; identifying, by a third cache agent operatively connected to a third cache and in response to the P2P writeback request, an invalid status of a cacheline in the third cache corresponding to the memory address; issuing, by the third cache agent and in response to identifying the invalid status, a writeback pull (WBPull) request to the first cache agent; transferring, by the first cache agent, a state of a cacheline in the first cache corresponding to the memory address to a chosen cache selected from a group consisting of the second cache and the third cache; and downgrading the cacheline in the first cache.

In general, in one aspect, the invention relates to a system for managing caches. The system comprises: a first processor comprising a first core, a second core, and a third core; a first cache located on the first processor and associated with the first core; a second cache located on the first processor and associated with the second core; a third cache located on the first processor and associated with the third core; a first cache agent operatively connected to the first cache and configured to broadcast a peer-to-peer (P2P) request for a memory address using a first physical network on the processor; a second cache agent operatively connected to the second cache and configured to issue, using a second physical network on the processor, a first response to the P2P request based on a type of the P2P request and a state of a cacheline in the second cache corresponding to the memory address; a third cache agent operatively connected to the third cache and configured to issue a second response to the P2P request using the second physical network, wherein the first cache agent is further configured to modify a state of a cacheline in the first cache corresponding to the memory address based on the first response and the second response.

Other aspects of the invention will be apparent from the following description and the appended claims.

BRIEF DESCRIPTION OF DRAWINGS

FIG. 2 shows a table regarding cacheline states in accordance with one or more embodiments of the invention.

FIG. 3 shows a table regarding peer-to-peer (P2P) request types in accordance with one or more embodiments of the invention.

FIG. 6 shows a table regarding responses to P2P requests.

FIG. 7 shows a table regarding changes to cacheline states in response to P2P requests.

FIG. 10 shows table regarding changes to cacheline states as a function of received responses to P2P requests.

DETAILED DESCRIPTION

Figure 1:
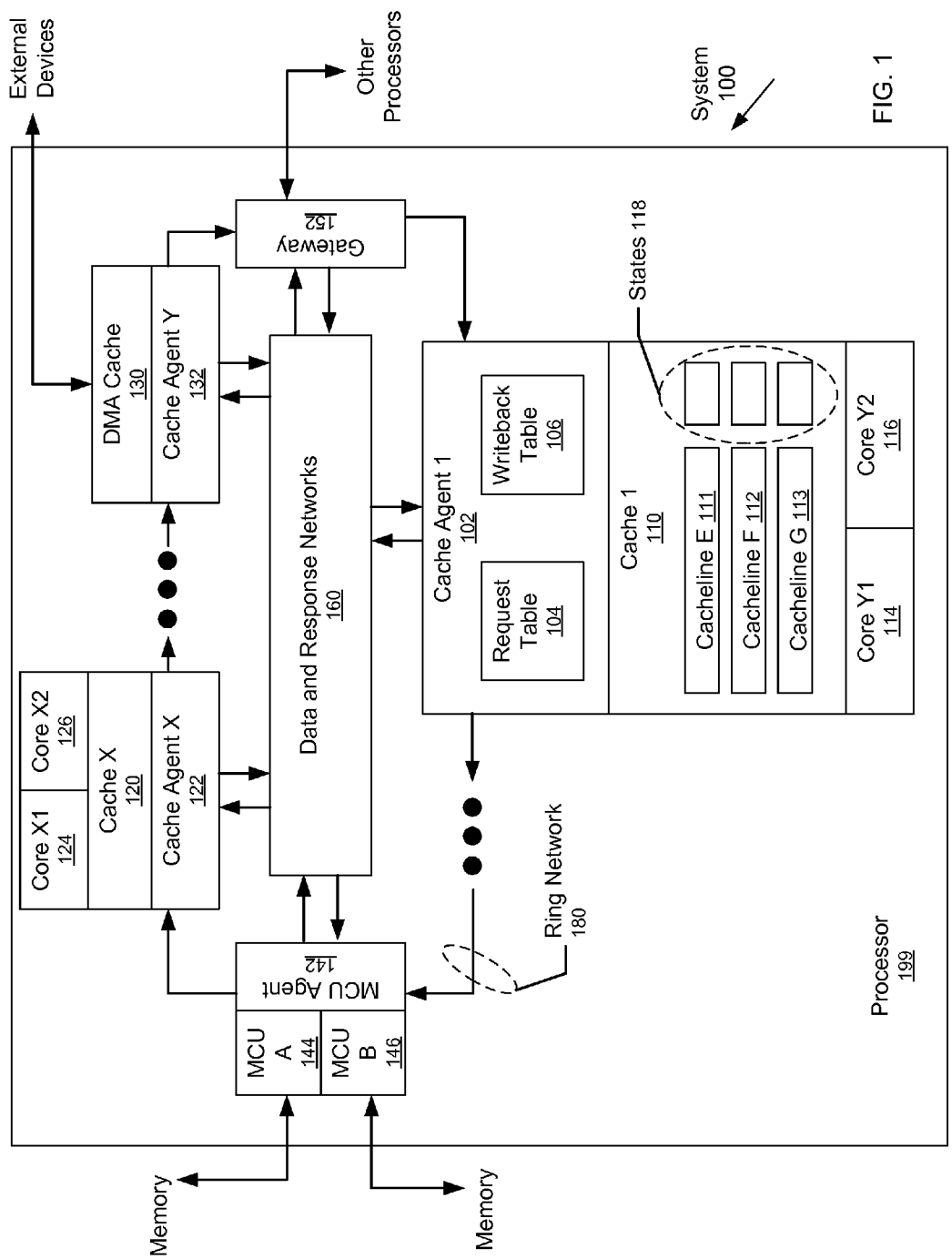
FIG. 1 shows a block diagram depicting a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for maintaining cache coherency among multiple caches on a multi-core processor. Specifically, each cache is associated with a cache agent and at least one core of the multi-core processor. Further, each cache holds multiple cachelines in various states. The cache agent broadcasts peer-to-peer (P2P) requests for the purposes of resolving cache misses and/or transferring control of a cacheline to another cache. The cache agent also processes responses (e.g., from other cache agents) to the P2P requests.

FIG. 1 shows a system (100) in accordance with one or more embodiments of the invention. As shown in FIG. 1, the system (100) includes a processor (199) having multiple processor cores (e.g., Core Y1 (114), Core Y2 (116), Core X1 (124), Core X2 (126)) operatively connected to multiple caches (e.g., Cache 1 (110), Cache X (120)). The processor (199) also includes a Direct Memory Access (DMA) Cache (130) operatively connected to one or more external (i.e., off-processor) devices; one or more memory control units (MCUs) (e.g., MCU A (144), MCU B (146)) for communicating with off-processor main memory; and one or more gateways (e.g., gateway (152)) that interact, for a given memory address, with an inter-processor coherence protocol for maintaining cache coherence between the processor (199) and other processors.

In order to successfully execute instructions, the processor cores (114, 116, 124, 126) and/or external devices must frequently access (e.g., read from and/or write to) one or more memory addresses in main memory. In order to expedite execution of these instructions, the contents of some memory addresses may be locally stored in the caches (110, 120, 130), which have faster access times than main memory. If a cache (110, 120, 130) is not storing the contents of a required memory address, or if the cache (110, 120, 130) is not storing the contents of the memory address in the required state (discussed below), a cache miss has occurred.

The caches (110, 120, 130) store cachelines corresponding to one or more memory addresses in main memory. For example, the Cache 1 (110) stores Cacheline E (111), Cacheline F (112), and Cacheline G (113). Each cacheline (111, 112, 113) corresponds to one or more memory addresses in main memory. Further, each cacheline (111, 112, 113) may also be held by another cache (e.g., 120, 130) in the system (100). If a cacheline is valid in any cache (110, 120, 130), a unique cache (110, 120, 130) is designated a "supplier" for that cacheline. The supplier supplies the cacheline to service a cache miss in another cache. In one or more embodiments of the invention, upon filling or upgrading a cacheline, the requester becomes the supplier. Alternatively, the supplier remains the supplier.

The Cache 1 (110) stores each cacheline (111, 112, 113) in one of various states (118). FIG. 2 shows a table (200) describing the various states in which a cacheline may be held. If a single cache (110, 120, 130) in the system (100) holds a cacheline, it is in supplier state; if multiple caches (110, 120, 130) hold a cacheline, one cache is in a supplier state and the others caches are in state S. A cache (110, 120, 130) has write access to a cacheline if it holds the cacheline in state M or state E. However, the processor (199) may have access to a cacheline even if each individual cache has no such access, if multiple caches within the processor (199) share the cacheline. The table (200) also shows processor access rights (i.e., inter-processor state) encoded in the state of the supplier cache. FIG. 2 also includes a table (205) with descriptions of the various inter-processor states. In one or more embodiments of the invention, the gateway (152) maintains a copy of the inter-processor state for every cacheline present in the caches (110, 120, 130).

Still referring to FIG. 1, in one or more embodiments of the invention, the processor (199) includes multiple cache agents (e.g., Cache Agent 1 (102), Cache Agent X (122), Cache Agent Y (132)) operatively connected to the caches (110, 120, 130). The cache agents (102, 122, 132) are configured to broadcast, in response to cache misses or in order to transfer control of a cacheline, P2P requests of various types to other cache agents (102, 122, 132) and process the responses (from the other cache agents) to the P2P requests. Similarly, the cache agents (102, 122, 132) are also configured to listen for (i.e., receive) broadcast P2P requests of various types and issue responses to the P2P requests. FIG. 3 shows a table (300) listing multiple P2P request types, descriptions of the P2P request types, and triggers of the P2P request types. FIG. 3 also shows a table (350) listing multiple response types (i.e., to P2P requests) and descriptions of the response types.

Figure 4:
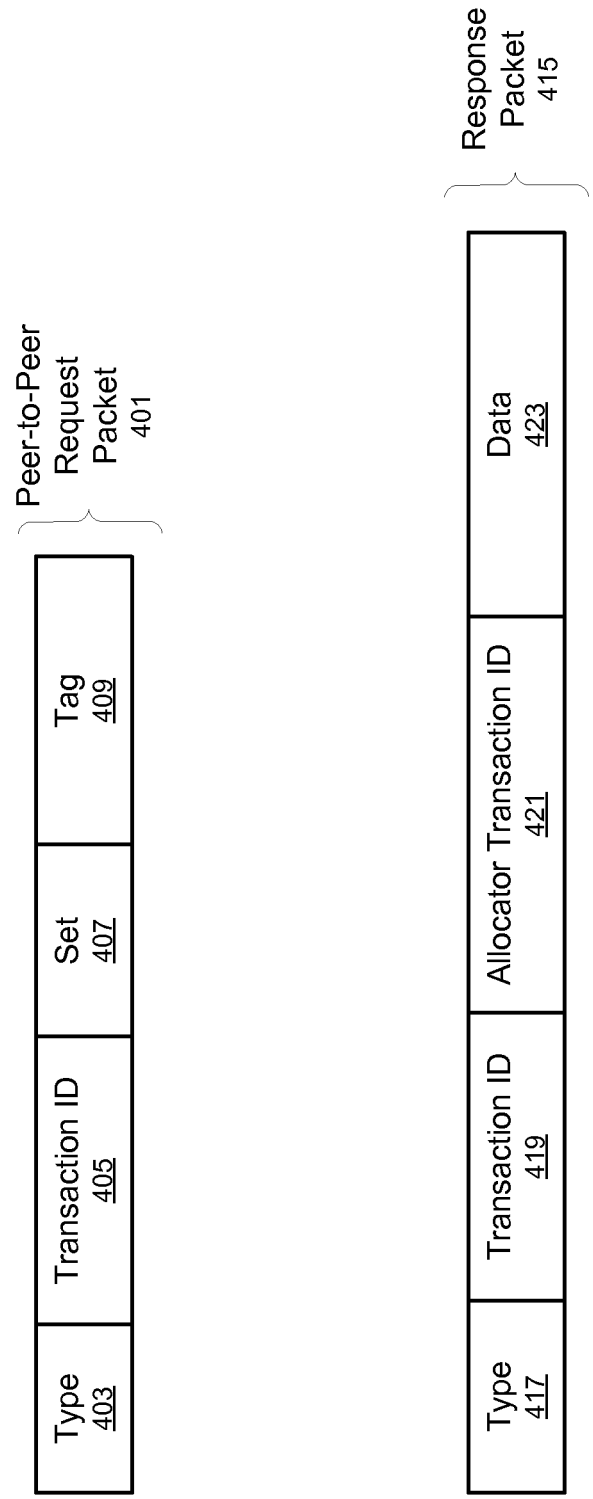
FIG. 4 shows request and response packets in accordance with one or more embodiments of the invention.

FIG. 4 shows a P2P request packet (401) and a response packet (415) in accordance with one or more embodiments of the invention. The P2P request packet (401) may be used by the cache agent (102, 122, 132) to broadcast a P2P request (i.e., one of the P2P requests described in the table (300) of FIG. 3) corresponding to a memory address. Similarly, the response packet (415) may be issued by a cache agent (102, 122, 132) in response to a P2P request corresponding to a memory address. As shown in FIG. 4, the P2P request packet (401) has multiple fields including a type field (403), a transaction identification (TID) field (405), a set field (407), and a tag field (409). As also shown in FIG. 4, the response packet (415) has multiple fields including a type field (417), a TID field (419), an allocator TID field (421), and a data field (423). Those skilled in the art, having the benefit of this detailed description, will appreciate that the P2P request packet (401) and/or the response packet (415) may have additional fields not shown. Further, not all packets carry all fields.

In one or more embodiments of the invention, the type field (403) identifies the type of the P2P request (e.g., PRTS, PRTO, PRTU, PWB, discussed above in the table (300) of FIG. 3) for the cacheline and corresponding memory address; the TID field (405) is a concatenation of an ID of the broadcasting cache agent and an ID assigned to the P2P request by the broadcasting cache agent; the set field (407) identifies the L3 index of the memory address (i.e., bits [19:6] of the memory address); and the tag field (409) identifies the L3 tag of the memory address (i.e., bits [49:20] of the memory address).

In one or more embodiments of the invention, the type field (417) identifies the type of the issued response (e.g., one of the response types in the table (350) of FIG. 3); the TID field (419) equals the TID field (405) of the triggering P2P request; the allocator TID field (421) is an ID created by the responding cache agent to identify the response; and the data field (423) stores the data value of the cacheline. In one or more embodiments of the invention, the value in the allocator TID field (421) is referred to as the WBAckID, when the response is WBAck. In one or more embodiments of the invention, the value in the allocator TID field (421) is referred to as the WBPullID, when the response is WBPull.

Referring back to FIG. 1, in one or more embodiments of the invention, the cache agents (102, 122, 132) include request tables. For example, the cache agent 1 (102) includes the request table (104). Each entry in the request table (104) corresponds to a P2P request broadcast by the cache agent 1 (102). Further, each entry in the request table (104) includes the status (e.g., idle, active, failed, etc.) of the P2P request, the memory address associated with the P2P request, any responses received by the cache agent 1 (102) in response to the P2P request, and the TID of the P2P request (discussed above in reference to FIG. 4). Further still, the entry in the request table (104) is indexed by the TID of the P2P request.

In one or more embodiments of the invention, the cache agents (102, 122, 132) include writeback tables. For example, the cache agent 1 (102) includes the writeback table (106). The writeback table (106) records (i.e., logs) incoming writebacks to the cache 1 (110). Specifically, each entry in the writeback request table (106) includes the status (i.e., active or inactive) of the writeback and the memory address corresponding to the writeback.

Still referring to FIG. 1, in one or more embodiments of the invention, the cache agents (102, 122, 132), the gateway (152), and the MCU Agent (142) are operatively connected using the ring network (180). Accordingly, the ring network (180) may be used for broadcasting and receiving P2P requests. The ring network (180) may be a physical unidirectional or physical bidirectional network. In addition, the system (100) includes one or more physical data and response networks (160) for transmitting responses to P2P requests and the data (i.e., cacheline) associated with some responses. In one or more embodiments of the invention, at least one network in the data and response networks (160) is a single-driver-per-track free-running pipeline network for point-to-point responses.

Figure 5:
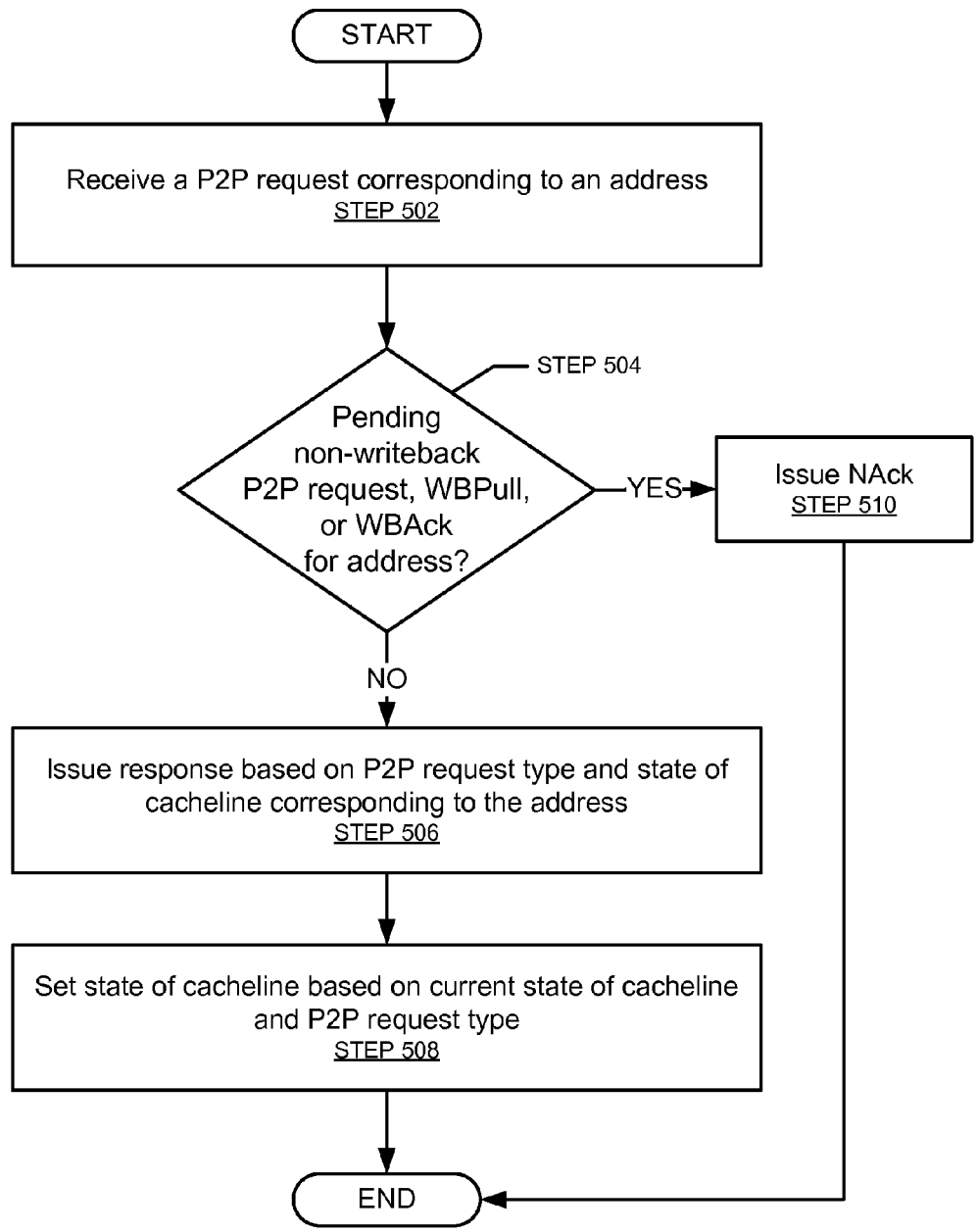
FIG. 5 shows a flowchart in accordance with one or more embodiments of the invention.

FIG. 5 shows a flowchart in accordance with one or more embodiments of the invention. The process shown in FIG. 5 may be executed, for example, by a slave cache agent in response to incoming non-writeback P2P requests (i.e., PRTS, PRTO, and PRTU requests) from a requester cache agent. The sequence of steps shown in FIG. 5 may differ among embodiments of the invention, and one or more of the steps may be performed in parallel and/or may be optional.

Initially, a P2P request corresponding to a memory address is received (STEP 502) by the slave cache agent. The P2P request may be broadcast by the requester cache agent on a physical network (e.g., Ring Network (180), discussed above in reference to FIG. 1). Further, the P2P request may correspond to a packet (e.g., P2P request packet (401), discussed above in reference to FIG. 4) identifying a type of the P2P request, a TID associated with the P2P request, and set and tag fields for identifying the cacheline and the corresponding memory address associated with the P2P request.

In STEP 504, it is determined whether a non-writeback P2P request (i.e., PRTS, PRTO, PRTU), a WBPull, or a WBAck (discussed below) is already pending for the memory address. In one or more embodiments of the invention, the existence of a pending non-writeback P2P request is determined by searching a request table (e.g., Request Table (104), discussed above in reference to FIG. 1) of the slave cache agent based on the memory address. In one or more embodiments of the invention, the existence of a pending WBPull or WBAck (discussed below) is determined by searching a writeback table (e.g., Writeback Table (106), discussed above in reference to FIG. 1) of the slave cache agent based on the memory address. When it is determined that a pending non-writeback P2P request, a WBPull, or a WBAck exists for the memory address, the process proceeds to STEP 510. However, when it is determined that there is no pending non-writeback P2P request, WBPull, or WBAck, the process proceeds to STEP 506.

In STEP 506, a response is issued by the slave cache agent based on the type of the P2P request and a state of the slave cacheline corresponding to the memory address. The issued response may correspond to a response packet (e.g., Response Packet (415)) identifying a type of the response and the TID associated with the received P2P request. The type of the response is based on the type of the P2P request and the state of the slave cacheline in the slave cache. FIG. 6 shows a table (600) identifying response types as a function of the P2P request type and the state of the cacheline in the slave cache. For example, as shown in FIG. 6, when the incoming P2P request is a PRTO request and the state of the cacheline in the slave cache is E or X, a response of type DataE is issued. Similarly, when the incoming P2P request is a PRTU and the state of the cacheline in the slave cache is S, a response of type Ack is issued. In one or more embodiments of the invention, the response is issued on a physical network (e.g., Data and Response Network (160)) that is different from the physical network on which the P2P request was received. Further, unlike the incoming P2P request, the issued response is not a broadcast message. Instead, the issued response is a point-to-point message. The intended destination of the issued response (i.e., the requester cache agent) may be identified from the TID in the response packet.

Still referring to FIG. 5, in STEP 508, the state of the cacheline in the slave cache is modified. For example, a slave cache may lose its status as a supplier for the cacheline in response to receiving the P2P request and issuing the response. FIG. 7 shows a table (700) describing the modification to the state of the cacheline in the slave cache as a function of incoming P2P request type and initial cacheline state. For example, as shown in FIG. 7, when the incoming P2P request is a PRTS request and the state of the cacheline in the slave cache is D (i.e., the slave cache is a supplier for the cache line), the state of the cacheline is set to (i.e., modified) state S. As shown in the table (700), if the slave cache holds the cacheline in any supplier state (i.e., M, D, O, E, X, Q) and a PRTS is received, the slave cache changes (i.e., modifies) the state to the non-supplier shared state S. Alternatively, the slave cache main continue to hold the cacheline in a supplier state (not shown) despite receiving a PRTS. This corresponds to embodiments where the supplier (i.e., slave cache) remains a supplier.

As discussed above, the process reaches STEP 510 when there exists a pending non-writeback P2P request, WBPull, or WBAck for the address. In STEP 510, a response of type negative acknowledge (NAck) is issued. The response includes the TID of the incoming P2P request. The process then ends.

Figure 8:
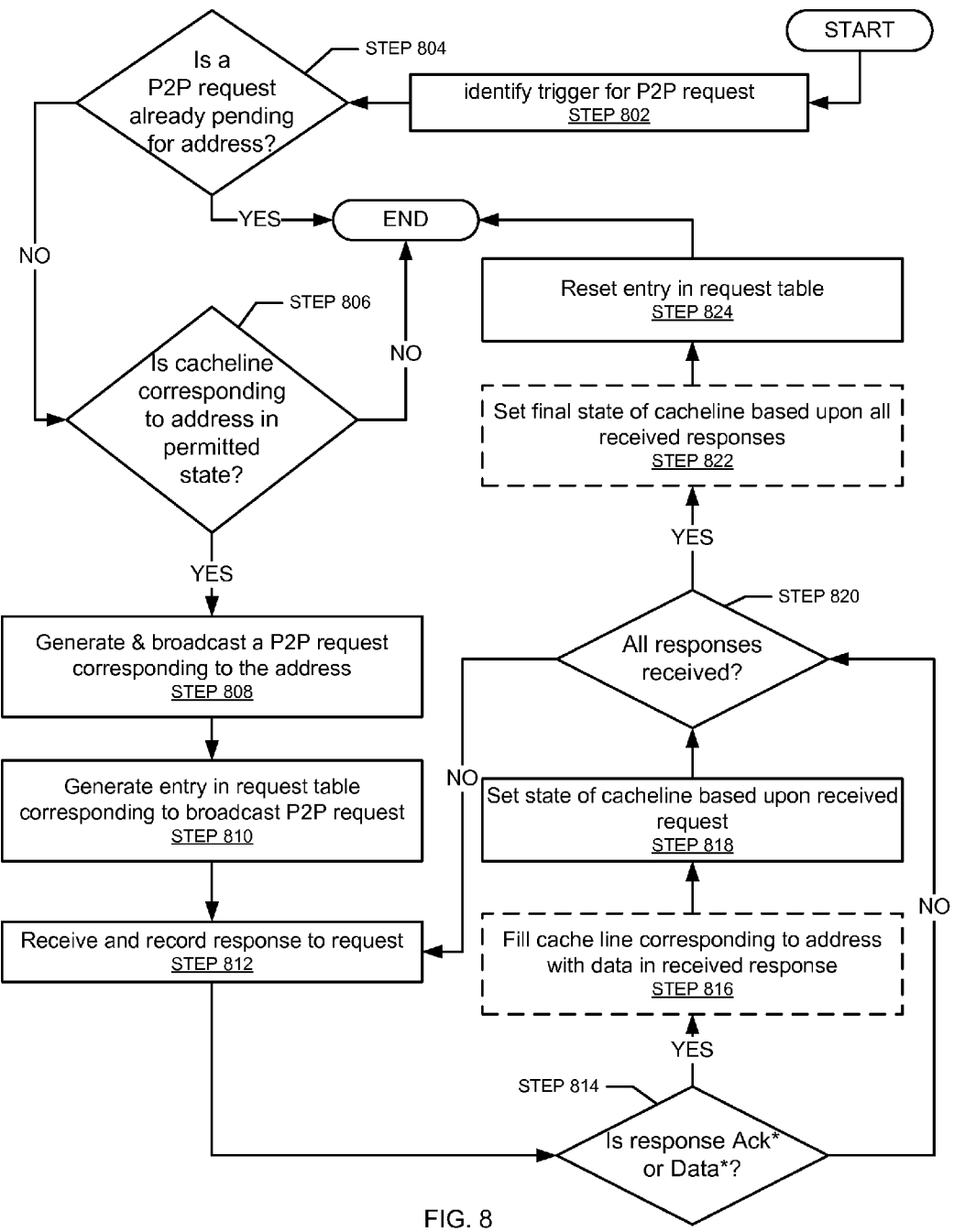
FIG. 8 shows a flowchart in accordance with one or more embodiments of the invention.

FIG. 8 shows a flowchart in accordance with one or more embodiments of the invention. The process shown in FIG. 8 may be executed, for example, by a requester cache agent when broadcasting a non-writeback P2P request (i.e., PRTS, PRTO, and PRTU requests). The sequence of steps shown in FIG. 8 may differ among embodiments of the invention, and one or more of the steps may be performed in parallel and/or may be optional.

Initially, a trigger for the P2P request is identified (STEP 802). The trigger may correspond to a cache miss. In other words, the cache does not have the cacheline required by the associated processing core or the cache does not hold the cacheline in the state needed by the processing core. Triggers for P2P request are discussed in the table (300) of FIG. 3.

In STEP 804 it is determined whether a P2P request is already pending for the memory address corresponding to the cacheline. In one or more embodiments of the invention, an existing P2P request for the memory address may be identified by searching the request table of the requester cache agent based on the memory address. When it is determined that no P2P requests for the memory address are pending, the process proceeds to STEP 806. Otherwise, the process ends.

Figure 9:
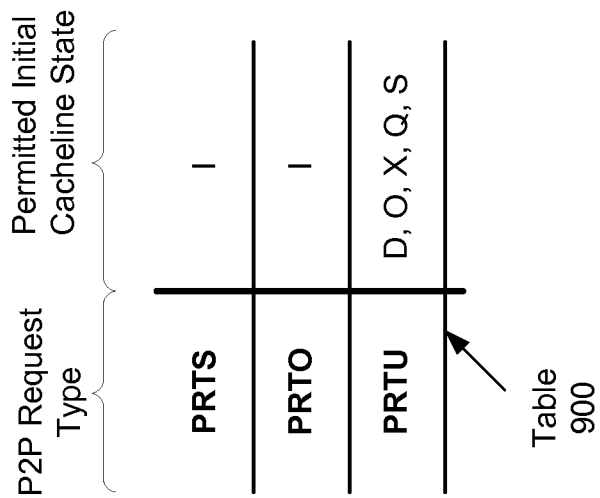
FIG. 9 shows a table regarding permitted initial cacheline states for multiple P2P request types.

In STEP 806, it is determined whether the cache holds the cacheline in a permitted state for the P2P request. FIG. 9 shows a table (900) with the permitted initial cacheline states as a function of P2P request type. For example, as shown in FIG. 9, P2P requests of type PRTS or PRTO are only permitted when the cacheline in held in state I. Similarly, as shown in FIG. 9, P2P requests of type PRTU are only permitted when the cacheline is held in one of states D, O, X, Q, or S. When it is determined that the cacheline is held in a permitted state, the process proceeds to STEP 808. Otherwise, the process ends.

In STEP 808, the P2P request corresponding to the memory address is generated and broadcast. In one or more embodiments of the invention, generating the P2P request includes generating a TID identifying the P2P request. The P2P request may correspond to a packet (e.g., P2P request packet (401), discussed above in reference to FIG. 4) including the TID, the type of the P2P request, and set and tag fields for identifying the memory address. Further, the P2P request may be broadcast on a physical network (e.g., Ring Network (180)) operatively connecting multiple cache agents.

In STEP 810, the P2P request is recorded (i.e., logged) in the request table (e.g., Request Table (104)) of the requester cache. Specifically, the entry in the request table indexed by the TID is populated with the status (e.g., idle, active, failed, etc.) of the P2P request, the memory address associated with the P2P request, any responses received by the cache agent in response to the P2P request (discussed below), and the TID of the P2P request.

In STEP 812, a response to the P2P request is received by the requester cache agent. The response may correspond to a packet (e.g., Response Packet (415), discussed above in reference to FIG. 4) identifying the type of the response, the TID of the P2P request, and in some cases, data (i.e., a cacheline). The response may be recorded (i.e., logged) in the entry of the requester table indexed by the TID.

In STEP 814, it is determined whether the received response is a positive acknowledgment with an inter-processor state (e.g., AckM, AckO, AckE, AckS) or data with an inter-processor state (e.g., DataM, DataO, DataE, DataS). When it is determined the received response is a positive acknowledgment or data with an inter-processor state, the processes proceeds to STEP 816. Otherwise, the process proceeds to STEP 820.

In STEP 816, the cacheline corresponding to the memory address is filled/updated with the data in the received response. Those skilled in the art, having the benefit of this detailed description, will appreciate that STEP 816 is only executed when the received response is data with an inter-processor state. In STEP 818, the state of the cacheline in the requester cache is modified. FIG. 10 shows a table (1005) with the next cacheline state as a function of the received response type. For example, as shown in FIG. 10, if the response type is DataE or AckE, the state of the cacheline is set to X. Similarly, if the response type is DataM or AckM, the state of the cacheline is set to D. In one or more embodiments of the invention, the state of the cacheline is set by the requester cache agent. In one or more embodiments of the invention, if the requester receives data (e.g., DataM, DataO, DataE, DataS) in response to a PRTS, the state of the cacheline is set to S. This corresponds to embodiments where the supplier (i.e., slave cache) remains a supplier.

Still referring to FIG. 8, in STEP 820 it is determined whether all of the responses have been received. When it is determined that all of the responses have been received, the process proceeds to STEP 822. Otherwise, the process returns to STEP 812.

In STEP 822, if the P2P request is a PRTO or PRTU and no Nack response was received, the state of the cacheline is set to a final state based on its current state (i.e., the state set in STEP 818). FIG. 10 shows a table (1010) with the final state of a cacheline as a function of the current state of the cacheline and the P2P request type. For example, if the P2P request is a PRTO request and the current cacheline state is X, the cacheline is set to the final state E. Similarly, if the P2P request is a PRTO request and the current cacheline state is Q, then the final cacheline state is also Q (i.e., no change).

Those skilled in the art, having the benefit of this detailed description, will appreciate that the P2P request was successful for a PRTO or PRTU request if the final cacheline state is M or E. Those skilled in the art, having the benefit of this detailed description, will also appreciate that the P2P request was successful for a PRTS request if the final cacheline state is D, O, X, or Q.

In STEP 824, the P2P request is now completed, and the entry in the request table corresponding to the P2P request may be reset (i.e., the status is set to complete, etc.).

Figure 11A:
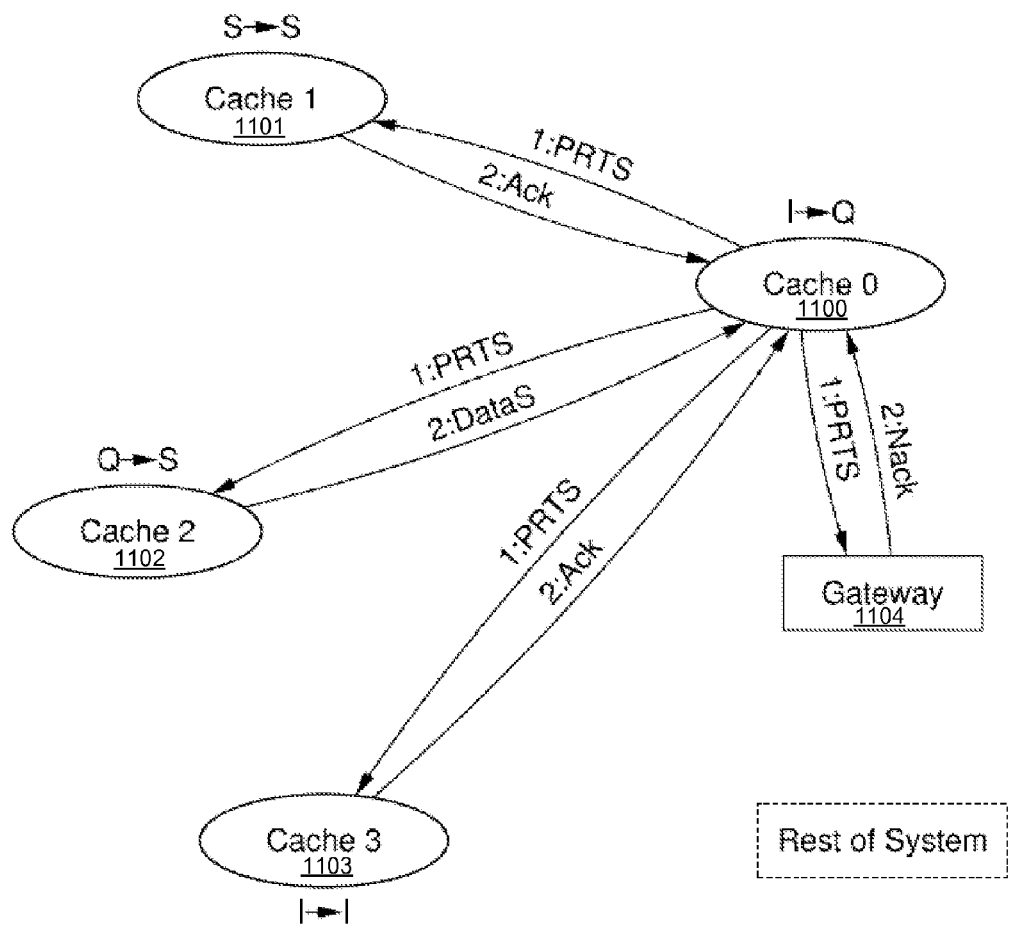
FIGS. 11A, 11B, and 11C show examples in accordance with one or more embodiments of the invention.

FIG. 11A shows an example in accordance with one or more embodiments of the invention. Specifically, FIG. 11A corresponds to a successful PRTS request. The cache agent attached to Cache 0 (1100) is making a request, with Cache 1 (1101), Cache 2 (1102), and Cache 3 (1103) being slave caches. Cache 2 (1102) is in state Q; the other slave caches are in state I or S. Cache 2 (1102) supplies a DataS packet (indicating that the inter-processor state is S) and is downgraded to state S; when Cache 0 (1100) receives the DataS packet, the data is installed in state Q. In this example, the gateway (1104) has no resources for servicing any request failure, so the gateway returns a Nack. Because the PRTS request is successful, no action is subsequently required of the gateway (1104).

Figure 11B:
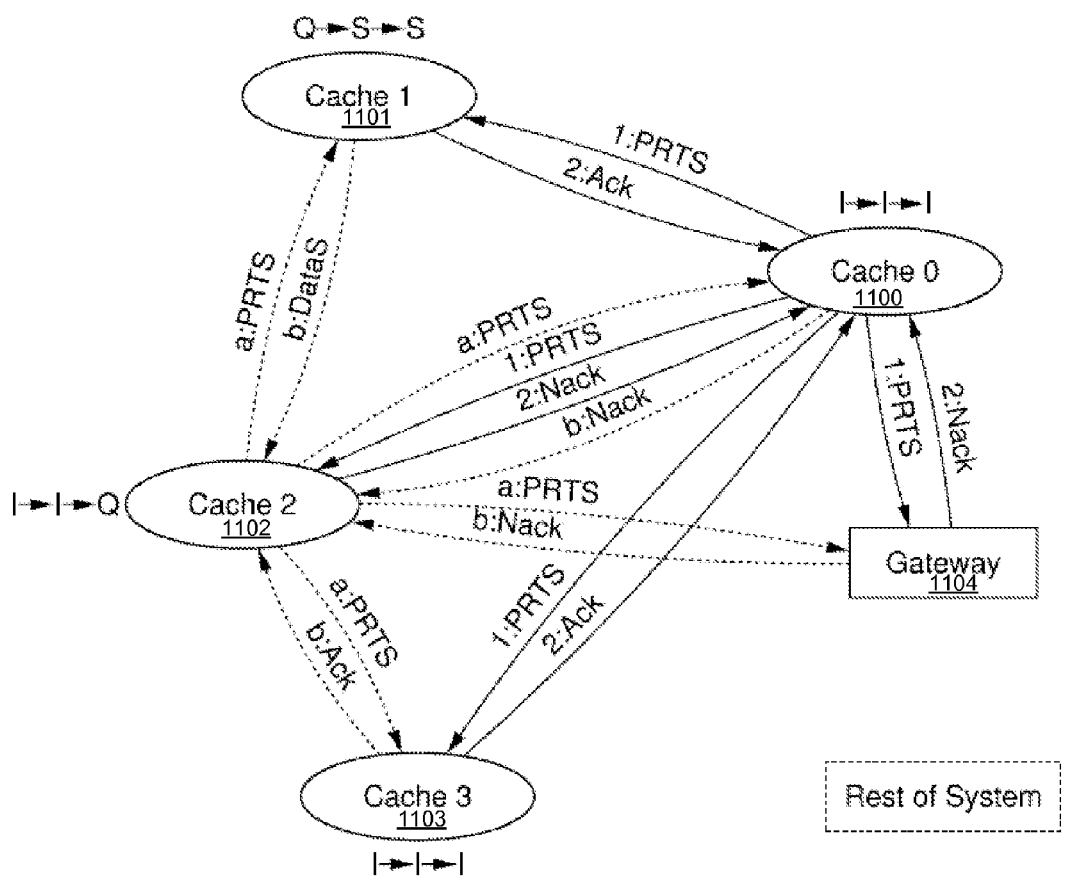

FIG. 11B shows an example in accordance with one or more embodiments of the invention. Specifically, FIG. 11B corresponds to an unsuccessful PRTS Request. The cache agent attached to Cache 0 (1100) is making a request, with Cache 1 (1101), Cache 2 (1102), and Cache 3 (1103) being slave caches. Cache 2 (1102) returns a negative acknowledgment because it has a pending PRTS of its own, which has taken the cacheline from Cache 1 (1101), leaving the cacheline in Cache 1 (1101) in state S. Cache 0's (1100) PRTS arrives at Cache 1 (1101) after it has ceased to be the supplier for the cacheline. Cache 0's (1100) PRTS arrives at Cache 2 (1102) before the DataS packet has arrived. Such racing between requests for the same cacheline from different cache agents is unavoidable because there is no point of serialization for requests to the same cacheline. Despite this lack of serialization, the peer-to-peer protocol maintains coherence between the caches even if it does not guarantee forward progress.

Figure 11C:
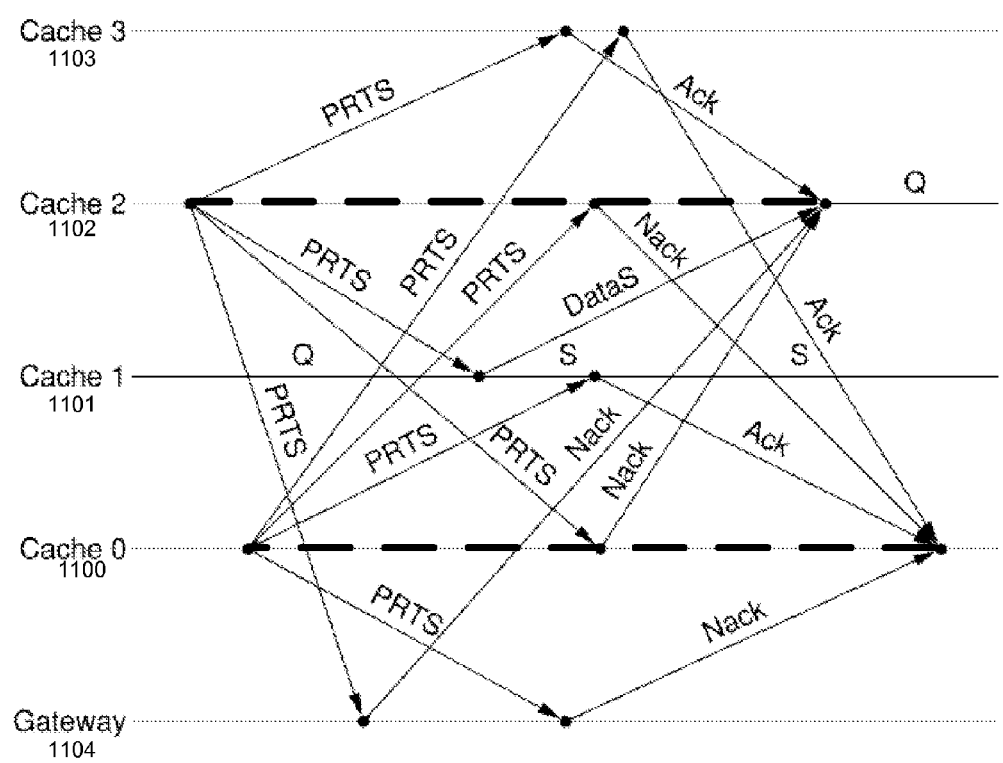

FIG. 11C shows an example in accordance with one or more embodiments of the invention. FIG. 11C is essentially the timelines corresponding to FIG. 11B. The timeline of each agent (i.e., Cache 0 (1100), Cache 1 (1101), Cache 2 (1102), Cache 3 (1103), and the gateway (1104)) is shown, together with the messages that pass between the agents. It can be seen that Cache 2 (1102) wins the race to the supplier Cache 1 (1101). Also a PRTS request received while a request is pending (indicated with a broken timeline) can be seen to result in a negative acknowledgment.

Figure 12:
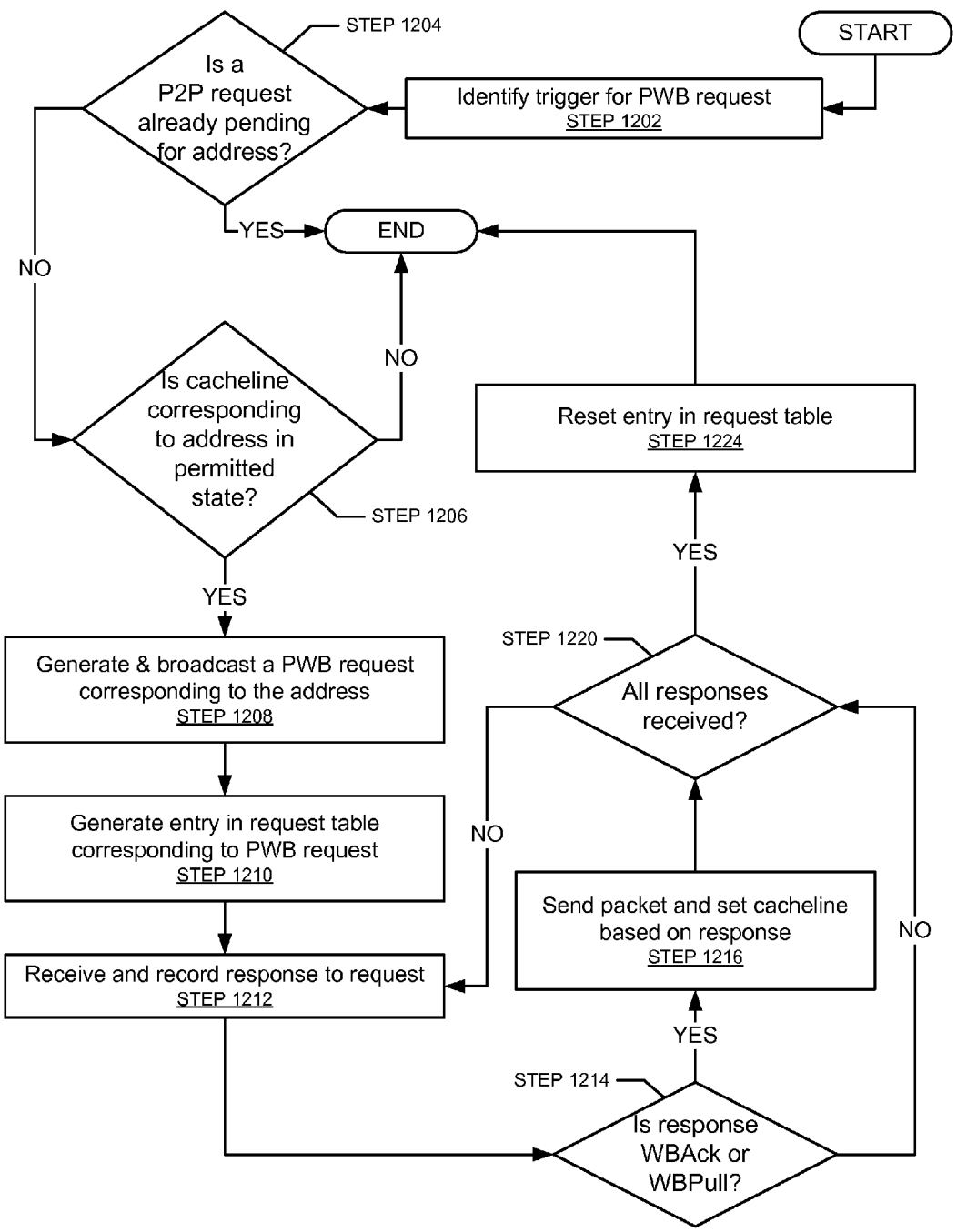
FIG. 12 shows a flowchart in accordance with one or more embodiments of the invention.

FIG. 12 shows a flowchart in accordance with one or more embodiments of the invention. The process shown in FIG. 12 may be executed, for example, by a requester cache agent when broadcasting a P2P writeback (PWB) request. The sequence of steps shown in FIG. 12 may differ among embodiments of the invention, and one or more of the steps may be performed in parallel and/or may be optional.

Initially, a trigger for the PWB request is identified (STEP 1202). The PWB request is a request to transfer ownership of a cacheline to a slave cache. Accordingly, the trigger may be an instruction issued by a processor core associated with the requester cache agent. Triggers for P2P request are discussed in the table (300) of FIG. 3.

In STEP 1204, it is determined whether a P2P request is already pending for the memory address corresponding to the cacheline. In one or more embodiments of the invention, an existing P2P request for the memory address may be identified by searching the request table of the requester cache agent based on the memory address. When it is determined that no P2P requests for the memory address are pending, the process proceeds to STEP 1206. Otherwise, the process ends.

In STEP 1206, it is determined whether the cache holds the cacheline in a permitted state for the PWB request. In one or more embodiments of the invention, the cache must hold the cacheline in state M, D, O, E, X, or Q to issue a PWB request. When it is determined that the cacheline is held in a permitted state, the process proceeds to STEP 1208. Otherwise, the process ends.

In STEP 1208, the PWB request corresponding to the memory address is generated and broadcast. In one or more embodiments of the invention, generating the PWB request includes generating a TID for the PWB request. The PWB request may correspond to a packet (e.g., P2P request packet (401), discussed above in reference to FIG. 4) including the TID, the type of the P2P request, and set and tag fields for identifying the memory address. Further, the P2P request may be broadcast on a physical network (e.g., Ring Network (180)) operatively connecting multiple cache agents.

In STEP 1210, the PWB request is recorded (i.e., logged) in the request table (e.g., Request Table (104)) of the requester cache. Specifically, the entry in the request table indexed by the TID is populated with the status (e.g., idle, active, failed, etc.) of the PWB request, the memory address associated with the PWB request, any responses received by the cache agent in response to the PWB request (discussed below), and the TID of the PWB request.

In STEP 1212, a response to the P2P request from a slave cache agent is received by the requester cache agent. The response may correspond to a packet (e.g., Response Packet (415), discussed above in reference to FIG. 4) identifying the type of the response, the TID of the PWB request, and the allocator TID field created by and identifying the responding slave cache agent. In one or more embodiments of the invention, the value of the allocator TID field is referred to as the WBAckID, when the response is WBAck. In one or more embodiments of the invention, the value of the allocator TID field is referred to as the WBPullID, when the response is WBPull. The response may be recorded (i.e., logged) in the entry of the requester table indexed by the TID.

In STEP 1214, it is determined whether the received response is a WBAck or a WBPull. When it is determined the received response is a WBAck or a WBPull, the processes proceeds to STEP 1216. Otherwise, the process proceeds to STEP 1220.

Figure 13:
FIG. 13 shows a table regarding packet types and new cacheline states as a function of received responses and existing cacheline states.

In STEP 1216, a packet is sent directly (i.e., not broadcast) to the slave cache based on the state of the cacheline in the requester cache, and then the cacheline in the requester cache is downgraded. FIG. 13 shows a table (1300) with the type of packet sent as a function of the received response (i.e., STEP 1212) and the existing state of the cacheline in the requester cache. As shown in FIG. 13, if the response is a WBAck and the existing state of the cacheline in the requester cache is Q, a packet with AckS is sent to the slave cache. Similarly, if the response is a WBPull and the existing state of the cacheline in the requester cache is E or X, a packet with DataE is sent to the slave cache. Any sent packet carries the allocator TID found in the received response (i.e., STEP 1212). Further, as shown in FIG. 13, the cacheline in the requester cache is downgraded to state I.

In one or more embodiments of the invention, to avoid a deadlock, the sending of a response to a WBPull/WBAck from a cache agent must not await the reception of responses for PWB from other cache agents.

Referring back to FIG. 12, in STEP 1220, it is determined whether all of the responses have been received. When it is determined that all of the responses have been received, the process proceeds to STEP 1224. Otherwise, the process returns to STEP 1212.

In STEP 1224, the PWB request is now completed, and the entry in the request table corresponding to the PWB request may be reset (i.e., the status is set to complete, etc.).

Figure 14:
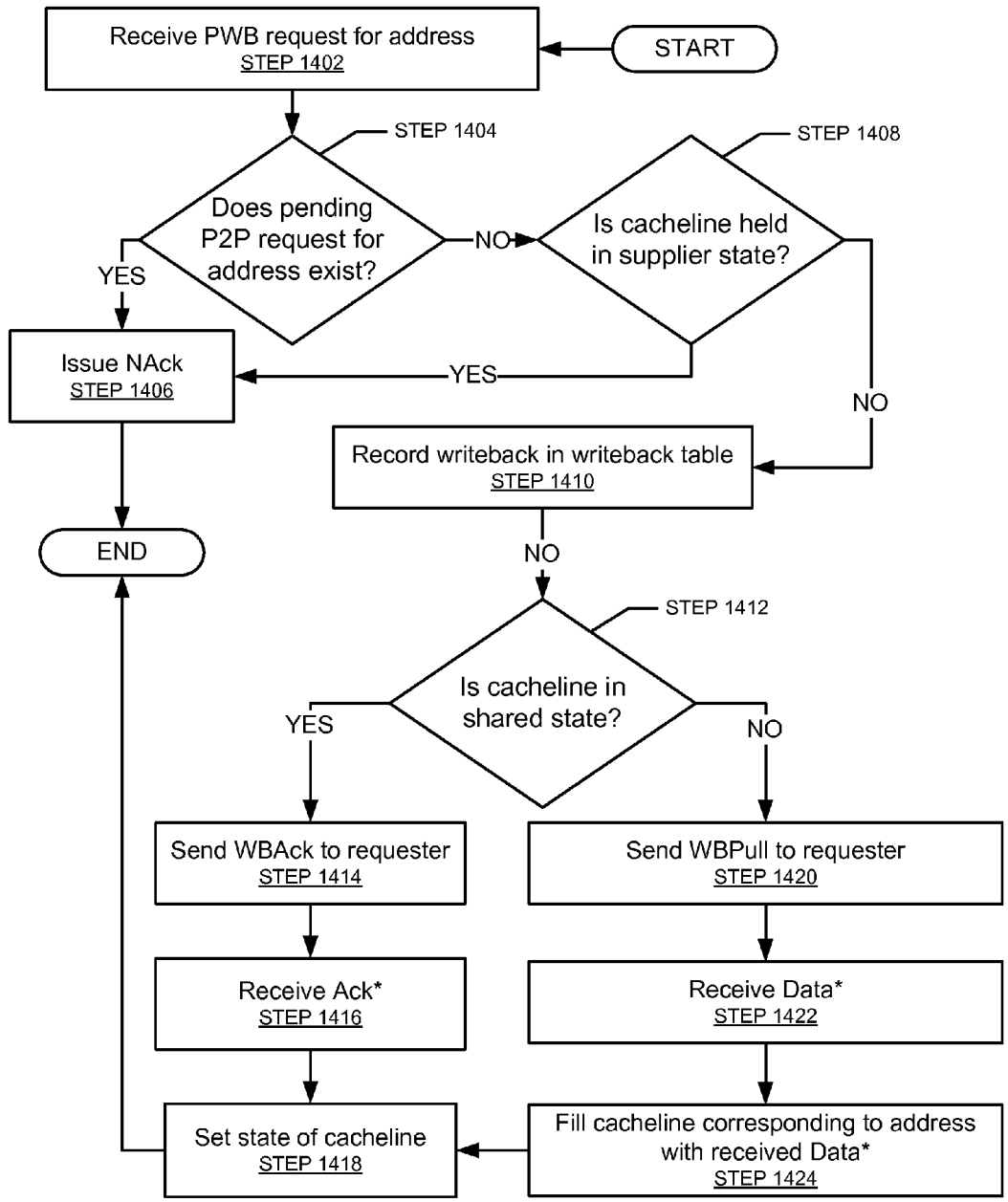
FIG. 14 shows a flowchart in accordance with one or more embodiments of the invention.

FIG. 14 shows a flowchart in accordance with one or more embodiments of the invention. The process shown in FIG. 14 may be executed, for example, by a slave cache agent in response to an incoming PWB request from a requester cache agent. The sequence of steps shown in FIG. 14 may differ among embodiments of the invention, and one or more of the steps may be performed in parallel and/or may be optional.

Initially, a PWB request corresponding to a memory address is received by the slave cache agent (STEP 1402). The PWB request may be broadcast by the requester cache agent on a physical network (e.g., Ring Network (180), discussed above in reference to FIG. 1). Further, the PWB request may correspond to a packet (e.g., P2P request packet (401), discussed above in reference to FIG. 4) identifying the type of the request, a TID associated with the PWB request, and set and tag fields for identifying the cacheline and the corresponding memory address associated with the PWB request.

In STEP 1404, it is determined whether a P2P request is already pending for the memory address. In one or more embodiments of the invention, the existence of a pending P2P request is determined by searching a request table (e.g., Request Table (104), discussed above in reference to FIG. 1) of the slave cache agent based on the memory address. When it is determined that a pending P2P request exists for the memory address, the process proceeds to STEP 1406. However, when it is determined that there are no pending P2P requests for the memory address, the process proceeds to STEP 1408.

In STEP 1408, it is determined whether the slave cache holds the cacheline in a supplier state. When it is determined that the slave cache holds the cacheline in a supplier state, the process proceeds to STEP 1406. When it is determined that the slave cache holds the cacheline in a shared or invalid state (i.e., not a supplier state), the process proceeds to STEP 1410.

In STEP 1410, a free entry in the writeback table (e.g., Writeback Table (106), discussed above in reference to FIG. 1) of the slave cache agent corresponding to the PWB request is activated. The entry records (i.e., logs) the PWB request from the requester cache. The entry includes the status (i.e., active or inactive) of the writeback and the memory address corresponding to the writeback.

In STEP 1412, it is determined whether the slave cache holds the cacheline in the shared state. When it is determined that the slave cache holds the cacheline in the shared state, the process proceeds to STEP 1414. However, when it is determined that the slave cache holds the cacheline in the invalid state, the process proceeds to STEP 1420.

In STEP 1414, a writeback positive acknowledgment (WBAck) is issued to the requester cache agent as a response to the PWB request. The issued response may correspond to a response packet (e.g., Response Packet (415)) identifying the type of the response and the TID associated with the received PWB request. In one or more embodiments of the invention, the issue response also includes a WBAck identification (ID) generated by the slave cache agent in response to the slave cache holding the cacheline in a shared state. The WBAckID identifies the slave cache/agent.

In STEP 1416, a packet is received from the requester cache agent. In one or more embodiments of the invention, the packet is a positive acknowledgment with an inter-processor state (e.g., AckM, AckO, AckE, AckS). The packet includes the WBAckID previously generated by the slave cache agent. In one or more embodiments of the invention, the packet is a NAck (not shown). In such embodiments, the process ends without visiting STEP 1418.

In STEP 1418, the state of the cacheline is set based on the received packet. Specifically, the state of the cacheline is set to the inter-processor state identified in the received packet.

As discussed above, the process reaches STEP 1420, when it is determined that the slave cache holds the cacheline in an invalid state. In STEP 1420, a writeback pull request (WBPull) is issued to the requester cache agent as a response to the PWB request. The issued response may correspond to a response packet (e.g., Response Packet (415)) identifying the type of the response and the TID associated with the received PWB request. In one or more embodiments of the invention, the issue response also includes a WBPull identification (ID) generated by the slave cache agent in response to the slave cache holding the cacheline in an invalid state. The WBPullID identifies the slave cache/agent.

In STEP 1422, a packet is received from the requester cache agent. In one or more embodiments of the invention, the packet includes data (i.e., the cacheline from the requester cache) with an inter-processor state (e.g., DataM, DataO, DataE, DataS). The packet includes the WBPullID previously generated by the slave cache agent. In STEP 1424, the cacheline is filled with the data extracted from the packet. In one or more embodiments of the invention, the packet is a NAck (not shown). In such embodiments, the process ends without visiting STEP 1424 or STEP 1418.

As discussed above, the process reaches STEP 1406 when there exists a pending P2P request for the address. In STEP 1406, a response of type negative acknowledge (NAck) is issued. The response includes the TID of the incoming PWB request. The process then ends.

Figure 15A:
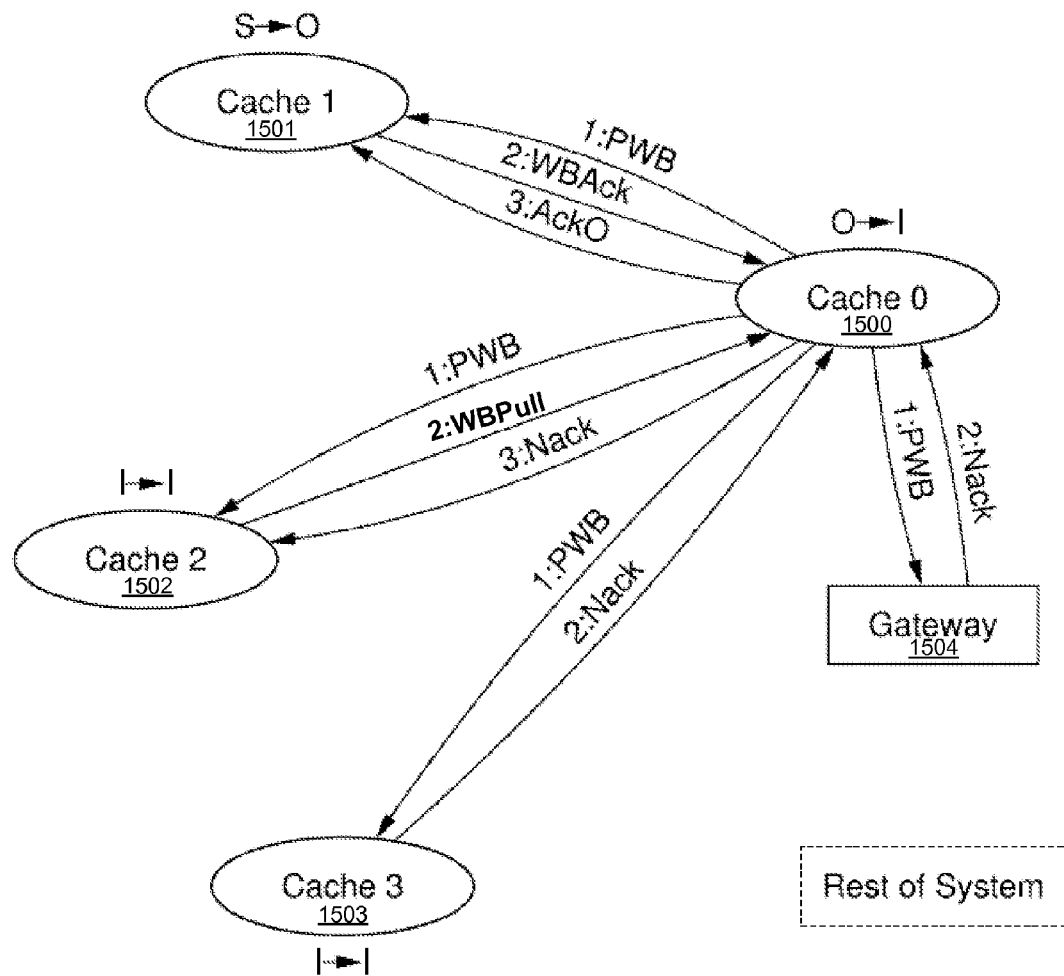
FIGS. 15A, 15B, and 15C show examples in accordance with one or more embodiments of the invention.

FIG. 15A shows an example in accordance with one or more embodiments of the invention. Specifically, FIG. 15A corresponds to a successful PWB request. The cache agent attached to Cache 0 (1500) is making a request, with Cache 1 (1501), Cache 2 (1502), and Cache 3 (1503) being slave caches. Because Cache 1 (1501) holds the cacheline in state S, it replies with WBAck and ends up accepting the cacheline in state O. No data need to be transferred because the cacheline data is already present. Cache 2 (1502) does not hold the cacheline, but can accept it, so it replies with WBPull. However, Cache 0 (1500) negatively acknowledges the WBPull because it selected Cache 1 (1501) to accept the writeback. Cache 3 (1503) doesn't hold the cacheline and can't accept it, so it negatively acknowledges the PWB. Gateway (1504) handling doesn't require further broadcasting to the other caches on the processor.

Figure 15B:
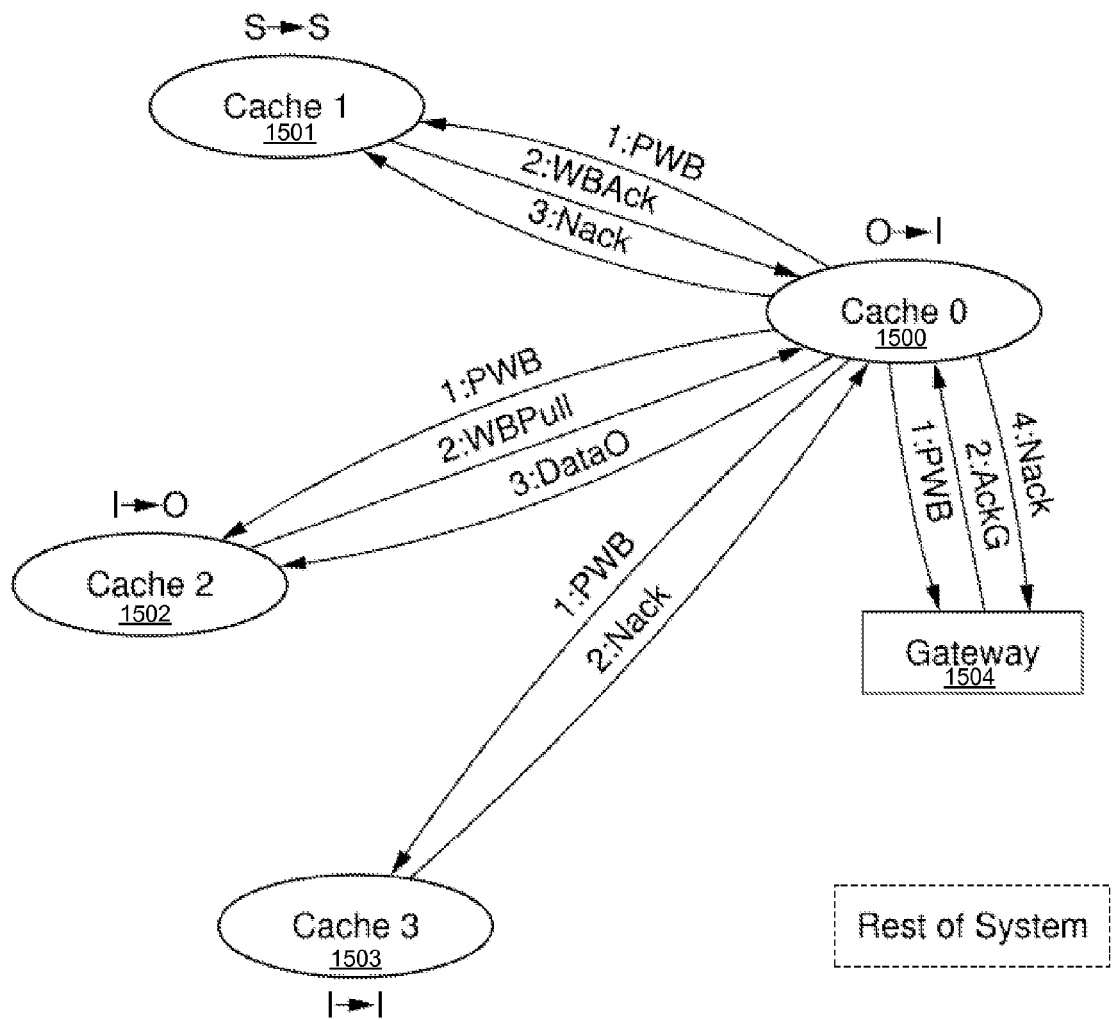

FIG. 15B shows an example in accordance with one or more embodiments of the invention. FIG. 15B is essentially the same as FIG. 15A, except that Cache 0 (1500) chooses Cache 2 (1502) to accept the data. Because Cache 2 (1502) doesn't hold a copy of the cacheline, data has to be transferred to complete the writeback.

Figure 15C:
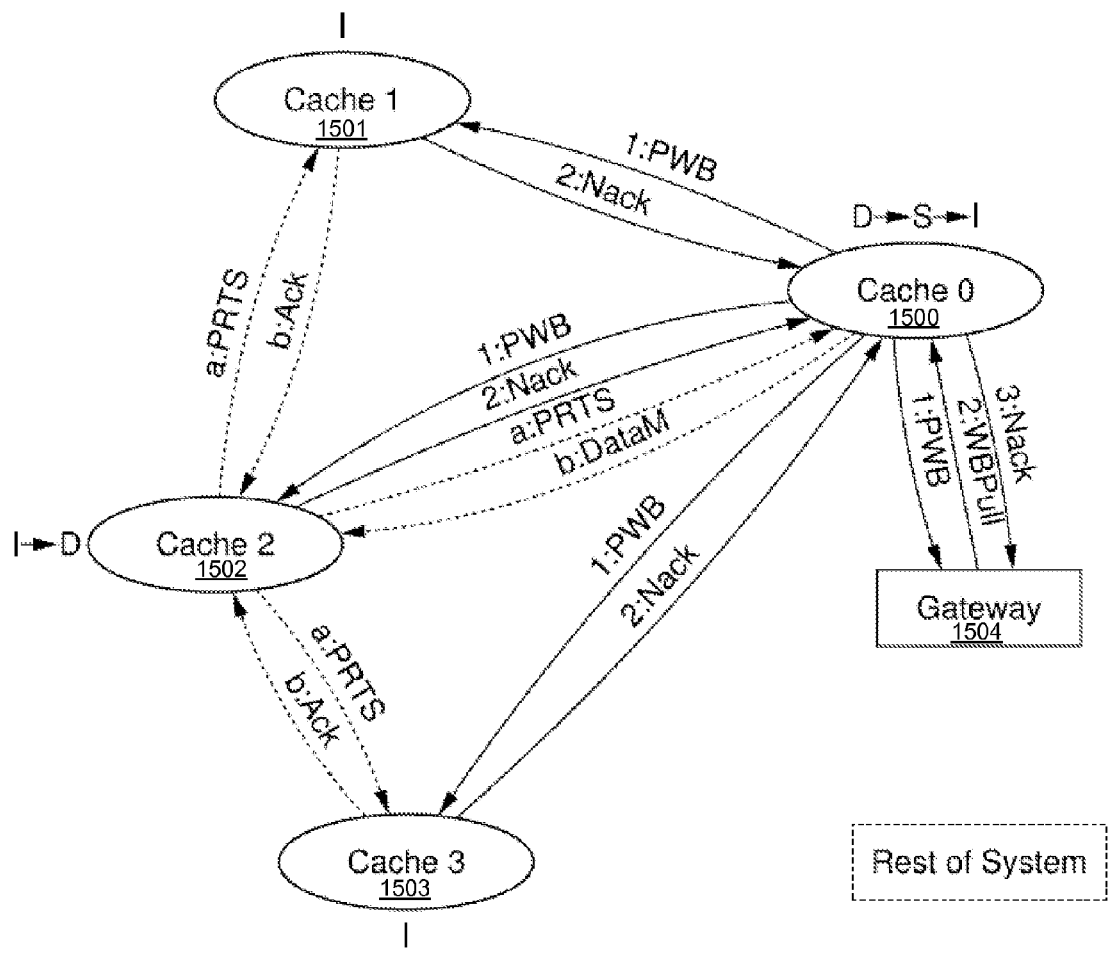

FIG. 15C shows an example in accordance with one or more embodiments of the invention. Specifically, FIG. 15C shows an example of a PWB succeeding because of a request by another cache agent. After Cache 0 (1500) sent the PWB, but before receiving the WBPull from the gateway, Cache 0 (1500) receives a PRTS request. It provides data to Cache 2 (1502), thus losing its supplier status; Cache 0 (1500) immediately silently downgrades itself to state I. It sends a negative acknowledgment to the gateway indicating that the gateway is not required to service the writeback.

Embodiments of the invention have one or more of the following advantages: fast cache-to-cache transfer between caches on the same processor; low latency P2P broadcast transactions between caches that maintain coherence despite not guaranteeing forward progress upon inter-transaction conflict; and caches that appear unified to the inter-processor coherence protocol.

Figure 16:
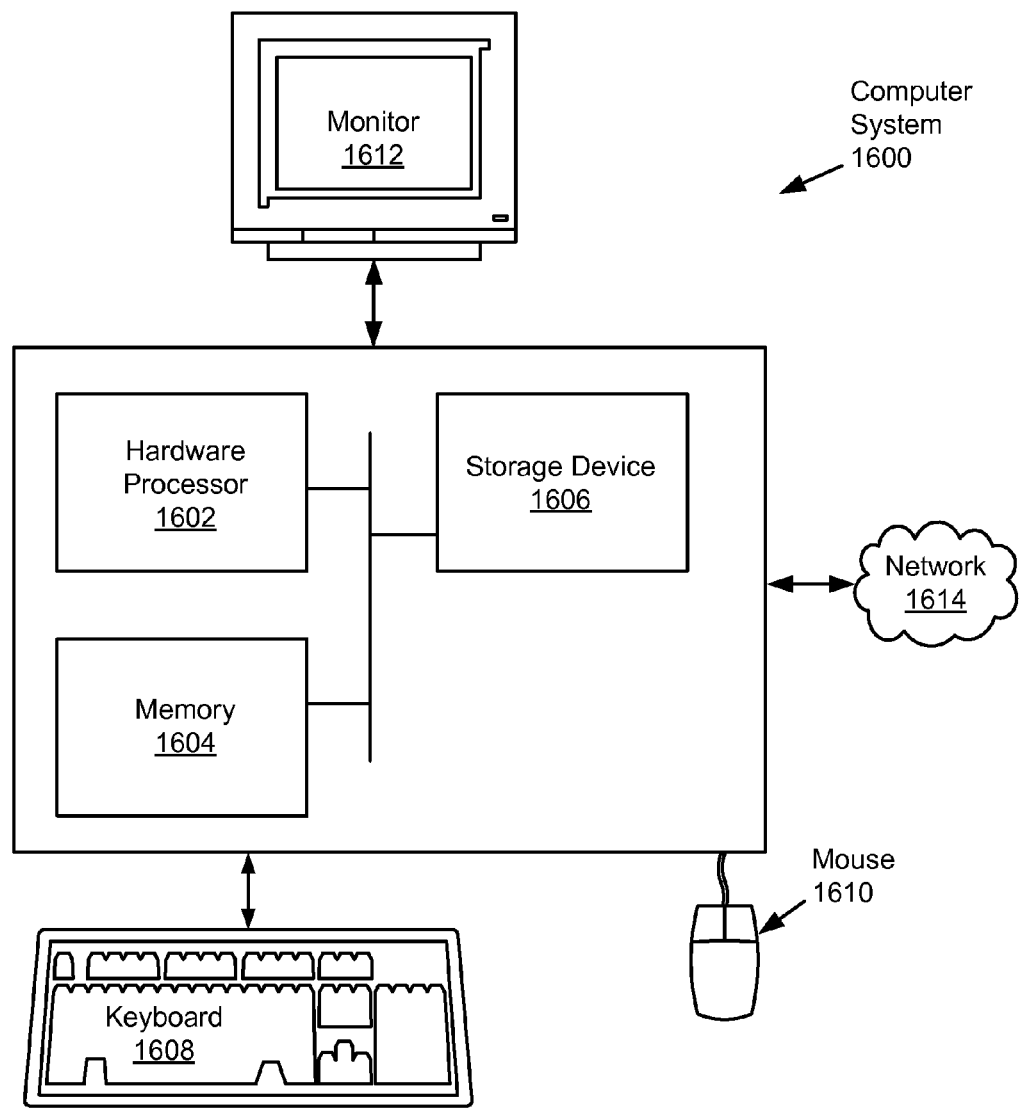
FIG. 16 shows a computer system in accordance with one or more embodiments of the invention.

Embodiments of the invention may be implemented on virtually any type of computer regardless of the platform being used. For example, as shown in FIG. 16, computer system (1600) includes one or more hardware processor(s) (1602), associated memory (1604) (e.g. random access memory (RAM), cache memory, flash memory, etc.), storage device (1606) (e.g. a hard disk, an optical drive such as a compact disk drive or digital video disk (DVD) drive, a flash memory stick, etc.), and numerous other elements and functionalities typical of today's computers (not shown). Computer system (1600) may also include input means, such as keyboard (1608), mouse (1610), or a microphone (not shown). Further, computer system (1600) may include output means, such as monitor (1612) (e.g. a liquid crystal display (LCD), a plasma display, or cathode ray tube (CRT) monitor). Computer system (1600) may be connected to network (1614) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, computer system (1600) includes at least the minimal processing, input, and/or output means necessary to practice embodiments of the invention.

Further, in one or more embodiments of the invention, one or more elements of the aforementioned computer system (1600) may be located at a remote location and connected to the other elements over a network. Further, embodiments of the invention may be implemented on a distributed system having a plurality of nodes, where each portion of the invention (e.g. data structure, converter module, layout engine) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, punch cards, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing caches, comprising:
broadcasting, by a first cache agent operatively connected to a first cache and using a physical ring network, a first peer-to-peer (P2P) request for a memory address;
issuing, by a second cache agent operatively connected to a second cache and using a physical data and response network, a first point-to-point response to the first P2P request based on a type of the first P2P request and a state of a cacheline in the second cache corresponding to the memory address;
issuing, by a third cache agent operatively connected to a third cache, a second point-to-point response to the first P2P request,
wherein the third cache agent does not receive the first point-to-point response, and
wherein the second cache agent does not receive the second point-to-point response; and
upgrading, by the first cache agent and based on the first point-to-point response and the second point-to-point response, a state of a cacheline in the first cache corresponding to the memory address.

2. The method of claim 1, further comprising:
comparing, by the first cache agent and before broadcasting the first P2P request, the state of the cacheline and a plurality of permitted states for the type of the first P2P request;
generating, by the first cache agent, a transaction identification (TID) identifying the first cache agent and the first P2P request;
recording, by the first cache agent, the memory address and the type of the first P2P broadcast in an entry of a request table indexed by the TID, wherein the first P2P request comprises the TID; and
modifying, by the second cache agent and based on the type of the P2P request, the state of the cacheline in the second cache corresponding to the memory address.

3. The method of claim 2, further comprising:
extracting, by the first cache agent, a data item from the first point-to-point response; and
populating, by the first cache agent, a portion of the cacheline in the first cache with the data item,
wherein the second point-to-point response is a positive acknowledgment comprising the TID.

4. The method of claim 2, wherein the first point-to-point response is a positive acknowledgment (Ack) comprising an inter-processor state and the TID, and wherein the type of the first P2P request is an upgrade request.

5. The method of claim 2, wherein the third cache comprises a cacheline corresponding to the memory address in an invalid state, and wherein the second point-to-point response is a positive acknowledgment (Ack) comprising the TID.

6. The method of claim 2, further comprising:
broadcasting, by the third cache agent and before the first P2P request is received by the third cache agent, a second peer-to-peer (P2P) request for the memory address using the physical ring network;
identifying, by the third cache agent and in response to the first P2P request, a pending status of the second P2P request in a request table of the third cache agent,
wherein the second point-to-point response is a negative acknowledgment (NAck) comprising the TID in response to identifying the pending status, and
wherein the third cache comprises a cacheline corresponding to the memory address in a supplier state.

7. The method of claim 1, wherein the first cache agent, the second cache agent, the third cache agent, the physical ring network, and the physical data and response network are located on a processor.

8. A method for managing caches, comprising:
broadcasting, by a first cache agent operatively connected to a first cache and using a first physical network, a peer-to-peer (P2P) writeback request for a memory address;
identifying, by a second cache agent operatively connected to a second cache and in response to the P2P writeback request, a shared status of a cacheline in the second cache corresponding to the memory address;
issuing, by the second cache agent and in response to identifying the shared status, a writeback positive acknowledgment (WBAck) to the first cache agent using a second physical network;
identifying, by a third cache agent operatively connected to a third cache and in response to the P2P writeback request, an invalid status of a cacheline in the third cache corresponding to the memory address;
issuing, by the third cache agent and in response to identifying the invalid status, a writeback pull (WBPull) request to the first cache agent;
transferring, by the first cache agent, a state of a cacheline in the first cache corresponding to the memory address to a chosen cache selected from a group consisting of the second cache and the third cache; and
downgrading the cacheline in the first cache.

9. The method of claim 8, further comprising:
generating, by the first cache agent, a transaction identification (TID) identifying the first cache agent and the P2P writeback request, wherein the P2P writeback request comprises the TID;
generating, by the second cache agent and in response to identifying the shared status, a WBAck identification (WBAckID) identifying the second cache agent and corresponding to the WBAck; and
recording, by the second cache agent, the memory address in an entry of a writeback table indexed by the WBAckID,
wherein the WBAck comprises the TID and the WBAckID.

10. The method of claim 9, wherein transferring the state of the cacheline comprises:
sending, by the first cache agent and to the second cache agent, a positive acknowledgment (Ack) comprising an inter-processor state and the WBAckID, wherein the chosen cache is the second cache;
upgrading, by the second cache agent and in response to the Ack, a state of a cacheline in the second cache corresponding to the memory address; and
sending, by the first cache agent and to the third cache agent, a negative acknowledgment (NAck),
wherein the WBPull request is received after transferring the state of the cacheline.

11. The method of claim 8, further comprising:
generating, by the first cache agent, a transaction identification (TID) identifying the first cache agent and the P2P writeback request, wherein the P2P writeback request comprises the TID;
generating, by the third cache agent and in response to identifying the invalid status, a WBPull identification (WBPullID) identifying the third cache agent and corresponding to the WBPull request; and
recording, by the third cache agent, the memory address in an entry of a writeback table indexed by the WBPullID, wherein the WBPull request comprises the TID and the WBPullID.

12. The method of claim 11, wherein transferring the state of the cacheline comprises:
sending, by the first cache agent and to the third cache agent, a value of the cacheline in the first cache, an inter-processor state, and the WBPullID, wherein the chosen cache is the third cache;
storing, by the third cache agent, the value in the cacheline of the third cache corresponding to the memory address;
upgrading, by the third cache agent, a state of the cacheline in the third cache; and
sending, by the first cache agent and to the second cache agent, a negative acknowledgment (NAck),
wherein the WBAck is received after transferring the state of the cacheline, and
wherein the chosen cache is the third cache.

13. A system for managing caches, comprising:
a first processor comprising a first core, a second core, and a third core;
a first cache located on the first processor and associated with the first core;
a second cache located on the first processor and associated with the second core;
a third cache located on the first processor and associated with the third core;
a first cache agent operatively connected to the first cache and configured to broadcast a peer-to-peer (P2P) request for a memory address using a physical ring network on the processor;
a second cache agent operatively connected to the second cache and configured to issue, using a physical data and response network on the processor, a first point-to-point response to the P2P request based on a type of the P2P request and a state of a cacheline in the second cache corresponding to the memory address;
a third cache agent operatively connected to the third cache and configured to issue a second point-to-point response to the P2P request using the physical data and response network,
wherein the second cache agent does not receive the second point-to-point response,
wherein the third cache agent does not receive the first point-to-point response, and
wherein the first cache agent is further configured to modify a state of a cacheline in the first cache corresponding to the memory address based on the first point-to-point response and the second point-to-point response.

14. The system of claim 13, further comprising:
a plurality of gateways located on the first processor,
wherein at least one of the plurality of gateways is configured to contact a second processor in response to the P2P request,
wherein the physical ring network operatively connects the first cache agent, the second cache agent, the third cache agent, and the plurality of gateways.

15. The system of claim 13, wherein the first cache agent comprises:
a request table having an entry recording the type of the P2P request and the memory address, and indexed by a transaction identification (TID),
wherein the P2P request comprises the TID, and
wherein the first point-to-point response comprises the TM, 16. The system of claim 15, wherein the first point-to-point response is a writeback pull (WBPull) request, and wherein the second cache agent comprises:
a writeback table having an entry recording the memory address and indexed by a WBPull identification (WBPullID),
wherein the first point-to-point response further comprises the WBPullID, and
wherein the first cache agent is further configured to send a value of the cacheline in the first cache, an inter-processor state, and the WHPullID to the second cache agent.

17. The system of claim 15, wherein the second point-to-point response is a writeback positive acknowledgment (WBAck), and wherein the third cache agent comprises:
a writeback table having an entry recording the memory address and indexed by a WBAck identification (WBAckID),
wherein the second point-to-point response comprises the WBAckID and
wherein the first cache agent is further configured to send a positive acknowledgment (Ack) comprising an inter-processor state and the WBAckID to the third cache agent.

18. The system of claim 15, wherein the first cache agent is further configured to extract a data item from the first point-to-point response and populate a portion of the cacheline in the first cache with the data item.

19. The system of claim 15, wherein the first point-to-point response is a positive acknowledgment (Ack) comprising an inter-processor state and the TID, and wherein the type of the P2P request is an upgrade request.

20. The system of claim 15, wherein the third cache comprises a cacheline corresponding to the memory address in an invalid state, and wherein the second point-to-point response is a positive acknowledgment (Ack) comprising the TID.

* * * * *

UNITED STATES PATENT AND TRADEMARK OFFICE
CERTIFICATE OF CORRECTION

PATENT NO.        : 8,756,378 B2                                            Page 1 of 1
APPLICATION NO.   : 13/030006
DATED             : June 17, 2014
INVENTOR(S)       : Loewenstein It is certified that error appears in the above-identified patent and that said Letters Patent is hereby corrected as shown below:

In the Specification

Column 1, line 18, delete "model," and insert -- model. --, therefor.

In the Claims

Column 16, line 15, in Claim 15, delete "TM," and insert -- TID. --, therefor.

Signed and Sealed this
Second Day of December, 2014

Michelle K. Lee
*Deputy Director of the United States Patent and Trademark Office*